United States Patent
Somasundaram et al.

(10) Patent No.: US 7,334,049 B1
(45) Date of Patent: Feb. 19, 2008

(54) APPARATUS AND METHODS FOR PERFORMING NETWORK ADDRESS TRANSLATION (NAT) IN A FULLY CONNECTED MESH WITH NAT VIRTUAL INTERFACE (NVI)

(75) Inventors: Mahadev Somasundaram, Santa Clara, CA (US); Siva S. Jayasenan, Cupertino, CA (US); Senthil M. Sivakumar, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 971 days.

(21) Appl. No.: 10/026,272

(22) Filed: Dec. 21, 2001

(51) Int. Cl.
*G06F 15/16* (2006.01)
(52) U.S. Cl. .............. 709/245; 709/227; 709/238
(58) Field of Classification Search .......... 709/245, 709/227, 238
See application file for complete search history.

(56) References Cited

U.S. PATENT DOCUMENTS

| | | | |
|---|---|---|---|
| 4,962,532 A | 10/1990 | Kasiraj et al. ............. 380/25 |
| 5,159,592 A | 10/1992 | Perkins .................... 370/401 |
| 5,287,103 A | 2/1994 | Kasprzyk et al. ...... 340/825.52 |
| 5,371,852 A | 12/1994 | Attanasio et al. .......... 395/200 |
| 5,406,557 A | 4/1995 | Baudoin .................... 370/61 |
| 5,426,637 A | 6/1995 | Derby et al. ............. 370/85.13 |
| 5,430,715 A | 7/1995 | Corbalis et al. ............ 370/54 |
| 5,477,531 A | 12/1995 | McKee et al. ............ 370/249 |
| 5,513,337 A | 4/1996 | Gillespie et al. .......... 395/186 |
| 5,550,984 A * | 8/1996 | Gelb ........................ 709/245 |
| 5,560,013 A | 9/1996 | Scalzi et al. .............. 395/700 |
| 5,608,738 A | 3/1997 | Matsushita ................. 371/37.1 |
| 5,621,727 A | 4/1997 | Vaudreuil .................. 370/60 |
| 5,623,601 A | 4/1997 | Vu ........................... 395/187.01 |
| 5,636,216 A | 6/1997 | Fox et al. ................... 370/402 |
| 5,790,548 A | 8/1998 | Sistanizadeh ............... 370/401 |
| 5,793,763 A | 8/1998 | Mayes et al. ............... 370/389 |
| 5,856,974 A | 1/1999 | Gervais et al. ............. 370/392 |
| 5,870,386 A | 2/1999 | Perlman et al. ............. 370/256 |

(Continued)

OTHER PUBLICATIONS

K. Egevang et al., "The IP Network Address Translator (NAT)", Network Working Group, pp. 1-10, May 1994. RFC 1631.

(Continued)

*Primary Examiner*—Bunjob Jaroenchonwanit
*Assistant Examiner*—Lan-Dai Truong
(74) *Attorney, Agent, or Firm*—Beyer Weaver LLP (57) ABSTRACT

Disclosed are methods and apparatus for performing network address translation (NAT) in a fully connected mesh with NAT virtual interface (NVI). In general terms, mechanisms (e.g., within a combination router/NAT device) are provided for translating network addresses of traffic going between two private domains or realms. These mechanisms may also be used to translate traffic going between a private and public domain. When a particular private address is translated into a public address, a binding is formed between the pre-translation address, the post-translation address, and the interface associated with the private or public address (e.g., an interface of the router/NAT device). Since bindings of different interfaces are tracked, a private address and its associated particular interface may be associated with a particular public address. Accordingly, the translation mechanisms of the present invention may be applied to two duplicate private addresses from two different private domains because the two identical private addresses are distinguished based on their different interfaces.

36 Claims, 8 Drawing Sheets

U.S. PATENT DOCUMENTS

| | | | | |
|---|---|---|---|---|
| 6,058,431 | A | * | 5/2000 | Srisuresh et al. ............ 709/245 |
| 6,061,797 | A | | 5/2000 | Jade et al. ................... 713/201 |
| 6,128,664 | A | | 10/2000 | Yanagidate et al. ......... 709/228 |
| 6,154,839 | A | | 11/2000 | Arrow et al. ................. 713/154 |
| 6,188,684 | B1 | | 2/2001 | Setoyama et al. ........... 370/352 |
| 6,360,265 | B1 | * | 3/2002 | Falck et al. .................. 709/227 |
| 6,892,245 | B1 | * | 5/2005 | Crump et al. ................ 709/245 |
| 6,944,167 | B1 | * | 9/2005 | McPherson .................. 370/401 |
| 2002/0116523 | A1 | * | 8/2002 | Warrier et al. ............... 709/238 |
| 2002/0184316 | A1 | * | 12/2002 | Thomas et al. ............. 709/206 |
| 2003/0009561 | A1 | * | 1/2003 | Sollee ......................... 709/227 |
| 2003/0018814 | A1 | * | 1/2003 | Kao et al. .................... 709/245 |
| 2003/0055978 | A1 | * | 3/2003 | Collins ........................ 709/227 |
| 2003/0065785 | A1 | * | 4/2003 | Jain ............................. 709/227 |
| 2003/0065817 | A1 | * | 4/2003 | Benchetrit et al. .......... 709/245 |
| 2003/0084162 | A1 | * | 5/2003 | Johnson et al. .............. 709/227 |
| 2003/0108041 | A1 | * | 6/2003 | Aysan et al. ................. 370/389 |

OTHER PUBLICATIONS

Y. Rekhter, et al. "Address Alloaction for Private Internets", RFC: 1597, Network Working Group, Mar. 1994.

Y. Rekhter, et al., "Address Allocation for Private Internets," RFC: 1918, Network Working Group, Feb. 1996, 9 pages.

Internet posting for Test Sites to Beta Test and IP Address Translation product; posted on Firewalls mailing list: posting made on or after Oct. 28, 1994.

* cited by examiner

APPARATUS AND METHODS FOR PERFORMING NETWORK ADDRESS TRANSLATION (NAT) IN A FULLY CONNECTED MESH WITH NAT VIRTUAL INTERFACE (NVI)

BACKGROUND OF THE INVENTION

The present invention relates to methods and apparatus for processing data within a computer network. More specifically, this invention relates to mechanisms for performing network address translation on data.

For a particular computer to communicate with other computers or web servers within a network (e.g., the Internet), the particular computer must have a unique IP address. IP protocol version 4 specifies 32 bits for the IP address, which theoretically gives about 4,294,967,296 unique IP addresses. However, there are actually only between 3.2 and 3.3 billion available IP addresses since the addresses are separated into classes and set aside for multicasting, testing and other special uses. With the explosion of the Internet, the number of IP address is not enough to give each computer a unique IP address.

One solution for addressing computers with the limited number of IP addresses is referred to as network address translation (NAT). NAT allows an intermediary device (e.g., computer, router or switch) located between the Internet network and a local network to serve as an agent for a group of local computers. A small range of IP addresses or a single IP address is assigned to represent the group of local computers. Each computer within the local group is also given a local IP address that is only used within that local group. However, the group's local IP addresses may be a duplicate of an IP address that is used within another local network. When a local computer attempts to communicate with a computer outside the local network, the intermediary device matches the local computer's local IP address to one of the intermediary device's assigned IP addresses. The intermediary device than replaces the local computer's local address with the matched assigned IP address. This matched assigned IP address is then used to communicate between the local computer and the outside computer. Thus, NAT techniques allow IP address to be duplicated across local networks.

Unfortunately, conventional NAT techniques only translate between a private or local realm and a public realm. That is, mechanisms are not available for translating between two private realms. Conventional NAT systems are configured to define its interfaces as "private" or "public." The NAT system then determines whether to NAT specific traffic based on the definitions of the interfaces through which the traffic is passed. For example, traffic that is received into a "private" interface and is outbound from a "public" interface is translated, and visa versa. However, traffic that is inbound and outbound on interfaces that are both defined as "private" is not translated.

Accordingly, there is a need for NAT mechanisms that are capable of translating between two different private domains.

SUMMARY OF THE INVENTION

Accordingly, the present invention provides methods and apparatus for performing network address translation (NAT) in a fully connected mesh with NAT virtual interface (NVI). In general terms, mechanisms (e.g., within a combination router/NAT device) are provided for translating network addresses of traffic going between two private domains or realms. These mechanisms may also be used to translate traffic going between a private and public domain. When a particular private address is translated into a public address, a binding is formed between the pre-translation address, the post-translation address, and the interface associated with the private or public address (e.g., an interface of the router/NAT device). Since bindings of different interfaces are tracked, a private address and its associated particular interface may be associated with a particular public address. Accordingly, the translation mechanisms of the present invention may be applied to two overlapped private addresses from two different private domains because the two identical private addresses are distinguished based on their different interfaces.

In one embodiment, a method for performing network address translation on data is disclosed. A first data having a first source address and a first destination address is received. The first data is sent by a first domain source to a second domain destination, and the first data is received into a first interface. Routing information for the first data is obtained. When the first source address is private, the first source address is translated into a first public address and a first binding between the first source address, the first public address, and the first interface is formed (if there is not such a binding formed already). The translation is performed prior to sending the first data to the second domain destination. When the first destination address has an associated binding, the first destination address is translated into a first private address specified by the binding associated with the first destination address. The translation of the first destination address is performed prior to sending the first data to the second domain destination. The first data is sent to the second domain destination based on the previously obtained routing information. In one implementation, the first public address is selected from a pool of available public addresses.

In a further implementation, when the first data has a DNS payload, the DNS payload of the first data is translated into a second public address. The translation of the first destination address is performed prior to sending the first data to the second domain destination. A second binding is formed between the DNS payload address, the second public address, and the first interface. In one aspect, translating the DNS payload and forming a second binding are only performed when the DNS payload contains a private address.

In a specific example, the first data is a DNS request, and a second data is received after the first data. The second data has a second source address, a second destination address, and a DNS payload address. The second data is a DNS reply received into a second interface and is sent by the second domain source to the first domain destination. Routing information is obtained for the second data. When the DNS payload address is private, the DNS payload address is translated into a second public address and a second binding is formed between the DNS payload address, the second public address, and the second interface. The translation is performed prior to sending the second data to the first domain destination. The second data is sent to the first domain destination based on the routing information obtained for the second data.

In a specific aspect, the first binding between the first source address, the first public address, and the first interface is formed by creating a first entry in a first table that includes a first identifier for both the first public address and the first destination address, a destination pointer that references information on how to translate a destination address of a first subsequently received data from the first public address to the first source address, and a source pointer that references a null value. The null value referenced by the source pointer indicates that the source address of the first subsequently received data does not require translation.

The first binding is modified after receipt of the DNS reply. The first binding is modified and the second binding is formed by creating a second entry in the first table that includes a second identifier for both the first source address and the second public address, a destination pointer that references information on how to translate a destination address of a second subsequently received data from the second public address into the DNS payload address, and a source pointer that references information on how to translate a source address of the same second subsequently received data from the first source address into the first public address. The first binding is modified and the second binding is formed by also creating a third entry in the first table that includes a third identifier for both the DNS payload address and the first public address, a destination pointer that references information on how to translate a destination address of a third subsequently received data from the first public address into the first source address, and a source pointer that references information on how to translate a source address of the third subsequently received data from the DNS payload address into the second public address. In a specific embodiment, the destination and source pointers each reference a pair having a private address of a particular interface and a corresponding public address, and the pair provide pre-translation and post-translation addresses for a particular source or destination address.

In a further embodiment, which interfaces may communicate with which other interfaces is tracked. The tracking is accomplished by setting up or dismantling one or more groups that each define which interfaces may communicate with which other interfaces. Additionally, a pool of public addresses may be selected for each group.

In another embodiment, the invention pertains to a network address translation (NAT) system operable to perform network address translation on data. The NAT system includes one or more processors and one or more memory. At least one of the memory and processors are adapted to provide at least some of the above described method operations. In yet a further embodiment, the invention pertains to a computer program product for performing network address translation on data. The computer program product has at least one computer readable medium and computer program instructions stored within at least one of the computer readable product configured to perform at least some of the above described method operations.

These and other features and advantages of the present invention will be presented in more detail in the following specification of the invention and the accompanying figures which illustrate by way of example the principles of the invention.

DETAILED DESCRIPTION OF SPECIFIC EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 1:
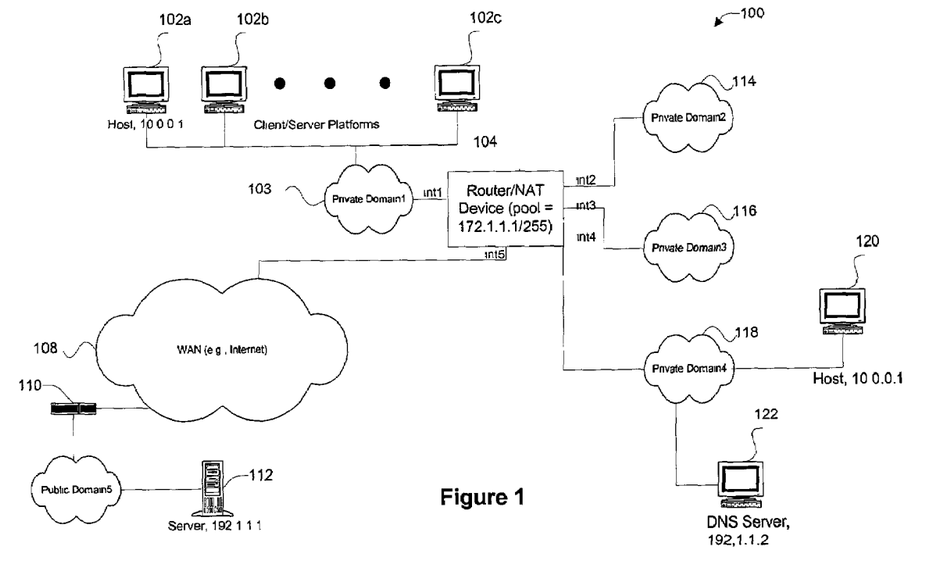
FIG. 1 is a diagrammatic illustration of portions of a network in which the techniques of the present invention may be implemented in accordance with one embodiment of the present invention.

FIG. 1 is a diagrammatic illustration of portions of a network 100 in which the techniques of the present invention may be implemented in accordance with one embodiment of the present invention. In general terms, the present invention provides mechanisms for performing network address translation (NAT) between a plurality of different domains. The different domains may both be private domains or one may be private and the other public. In the illustrated embodiment, these NAT techniques are implemented within a combination router and NAT device 104. Of course the NAT techniques of the present invention may be implemented in any suitable number and type of devices.

In the illustrated example, the NAT device 104 has five interfaces INT1 through INT5. Four of the interfaces INT1 through INT4 are each coupled to a private domain. For example, interface INT1 is coupled to private Domain1 103 and interface INT4 is coupled with private Domain4. Each domain may include any suitable number of local and private networks. As shown, Domain1 includes a private local area network (LAN) 102 of host computers (e.g., 102*a*, 102*b*, and 102*c*). Domain4 118 includes Host 120 and DNS Server 122. Domain4 118 may include other server or client platforms (not shown). The NAT device 104 is also coupled to a public Domain5 (e.g., a wide area network such as the Internet) 108 through interface INT5. Domain5 108 includes server 112, which may be accessed through router 110. Any number of routers and/or NAT devices may be distributed throughout network 100. For example, each domain may be associated with its own router/NAT device.

Figure 2:
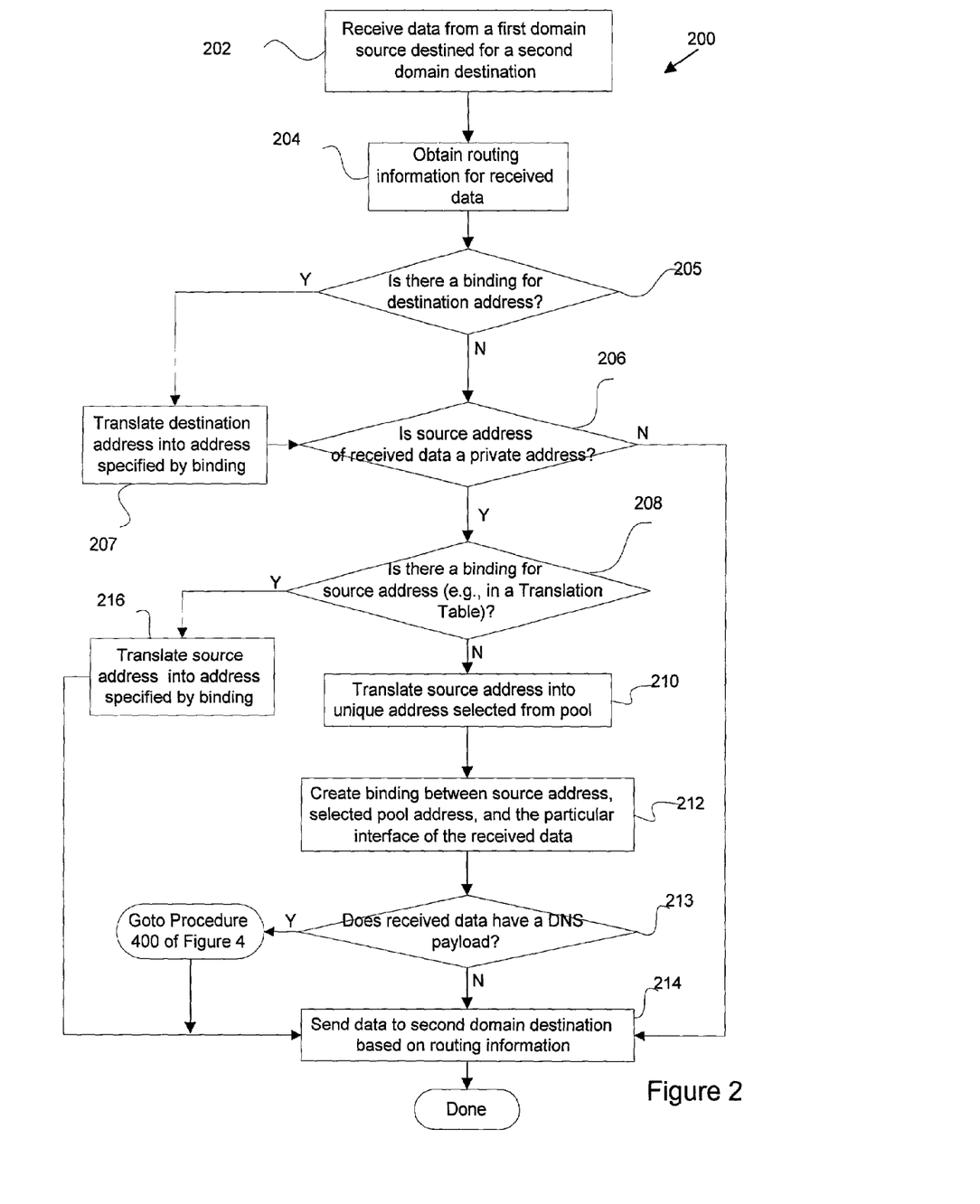
FIG. 2 is a flowchart illustrating a procedure for performing a network address translation on data sent from a first domain to a second domain in accordance with one embodiment of the present invention.
Figure 3:
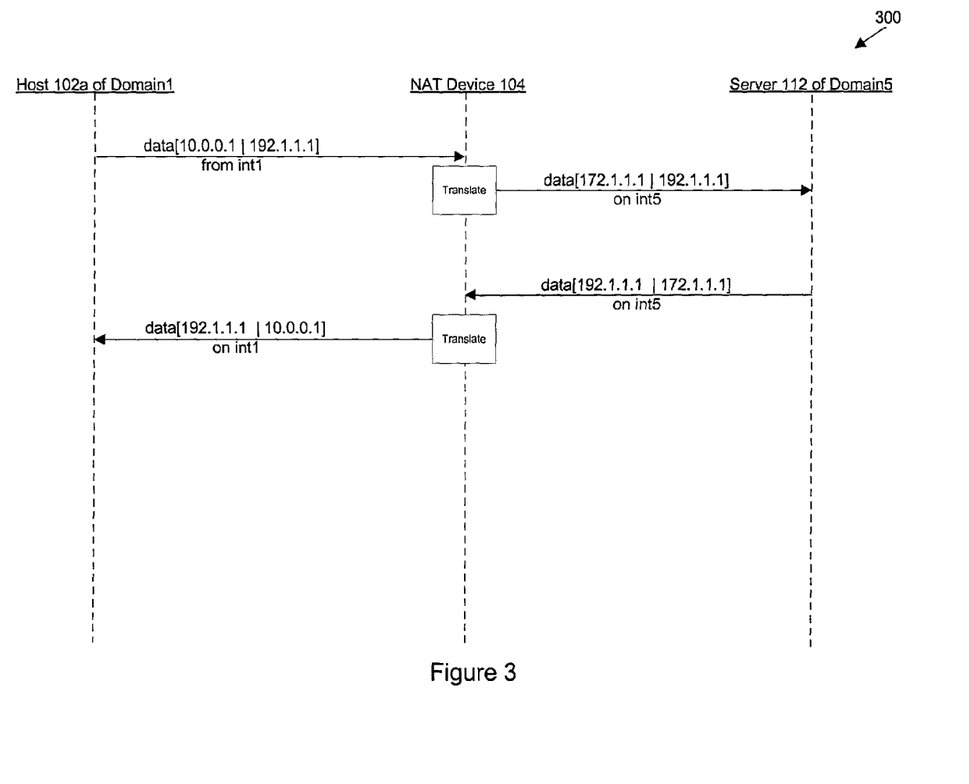
FIG. 3 illustrates implementation of the translation techniques of the present invention for data sent from a first private domain to a second public domain.

FIG. 2 is a flowchart illustrating a procedure 200 for performing a network address translation on data sent from a first domain to a second domain in accordance with one embodiment of the present invention. Initially, the NAT device receives data from a first domain source destined for a second domain destination in operation 202. The first and second domains may both be public domains, both be private domains, or a private and a public domain. FIG. 3 illustrates an example implementation of the translation techniques of the present invention for data sent from a first private domain to a second public domain. Specifically, data is sent between Host 102a of private Domain1 and Server 112 of public Domain5. An example implementation for data sent from a first private domain to a second private domain is described below with respect to FIG. 5. Referring to FIG. 3, Host 102a of Domain1 sends data into interface INT1 of NAT Device 104. Since private or local address 10.0.0.1 is assigned to source Host 102a and public or global address 192.1.1.1 is assigned to destination server 112, the data being sent from Host 102a to server 112 includes source address 10.0.0.1 and destination address 192.1.1.1.

Routing information is then obtained for the received data in operation 204. For example, it is determined through which interface the data is outbound. In the example of FIG. 3, the data is outbound on interface INT5. It is then determined whether there is a binding for the destination address in operation 205. In one embodiment, a binding generally associates a public address with a private address and its associated interface. In one implementation, bindings are listed within one or more Translation Tables stored within memory in the NAT device 106. A binding may have been previously created for the destination address when the associated host initially communicated with the host associated with the source address. In the illustration of FIG. 3, since the data is destined for the DNS Server which has a public address of 192.1.1.1, there will be no binding specified for the public address. That is, the destination address requires no translation into a private address.

It is then determined whether the source address of the received data is a private address in operation 206. If the source address is not a private address (i.e., it is a public address), no translation for the source address is required and the received data is sent to the second domain destination in operation 214. Transmission of the received data is based on the obtained routing information. For example, the routing information associates the destination address with its interface and the received data is sent out the associated interface.

It may be determined whether the source address is private in any suitable manner. For example, an access control list may be configured to define a plurality of addresses as public. The list may include a list of known public address and/or ranges of known public address. Public addresses require no translation, while private address do. Thus, when an address is not specified as a public address within the ACL, the address is defined as private and translation is required. Otherwise, the address is not translated and merely passed through the NAT device 104.

If the source address is a private address, it is then determined whether there is a binding for source address in operation 208. If there is a binding, the source address is then translated into the address specified by the binding in operation 216. If there is no specified binding, the source address is translated into a unique public address selected from the pool of the NAT device in operation 210. A binding is then created between the source address, the selected pool address, and the particular interface of the received data in operation 212.

In the example of FIG. 3 when data is initially sent between Host 102a of private Domain1 to Server 112 of public Domain5, a public address is selected from the pool as a replacement for the source address. In the illustrated example, NAT device 104 has public pool addresses 172.1.1.1 through 171.1.1.254. In one embodiment, pool addresses are used sequentially. Thus, the first pool address 172.1.1.1 is used for replacing the source address 10.0.0.1. A binding is then formed between the source address 10.0.0.1 and its associated interface INT1 and pool address 172.1.1.1. This binding will be used for subsequent translations on the private address 10.0.0.1 associated with interface INT1. That is, each private address and its associated interface becomes bound to the substituted public pool address. Thus, even if a private address is duplicated in two or more domains, each domain may have a unique binding that depends on the domain's interface. An example of private to private domain translation between two hosts having the same private address is illustrated further below with respect to FIG. 5.

Figure 4:
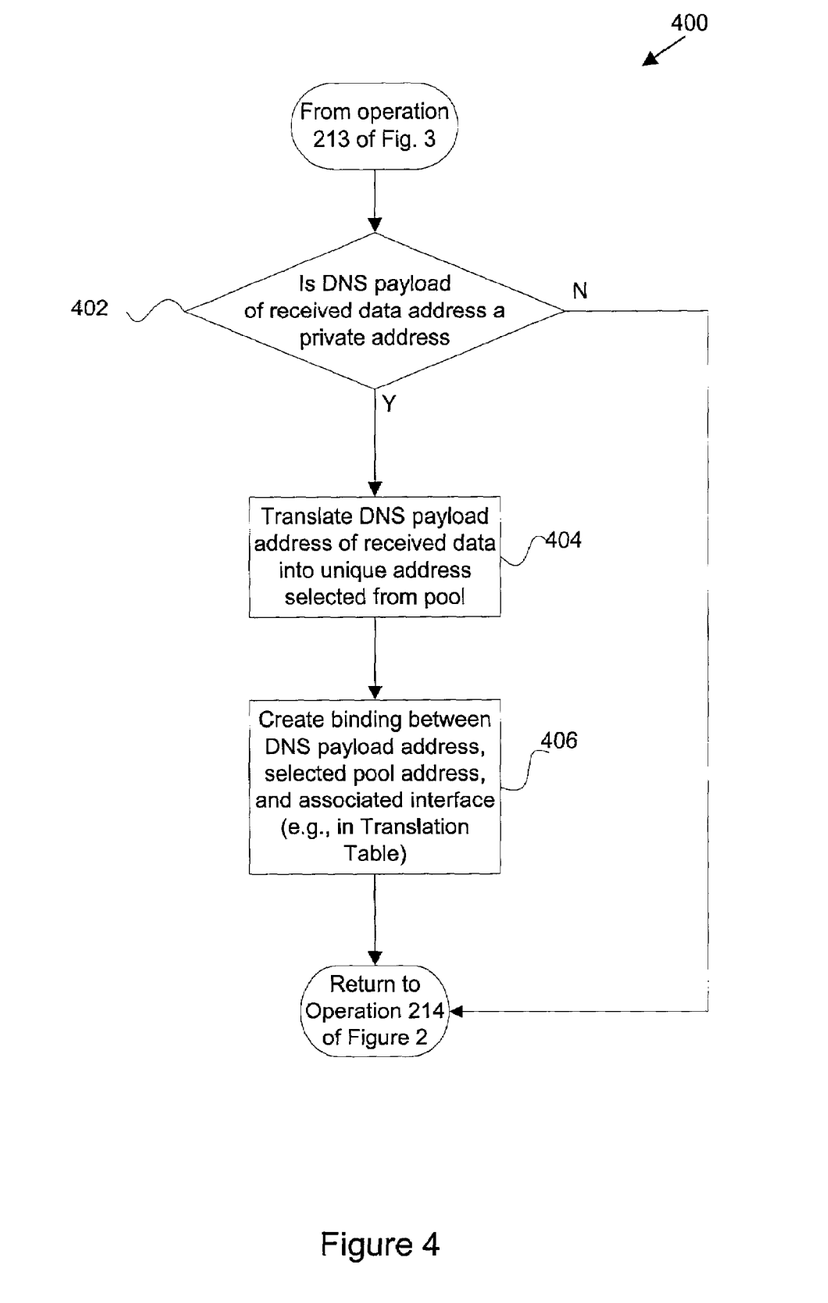
FIG. 4 is a flowchart illustrating a procedure for handling a DNS payload in accordance with one embodiment of the present invention.

Referring back to FIG. 2, it is then determined whether the received data has a DNS payload in operation 213. If there is a DNS payload the procedure 200 of FIG. 2 jumps to the procedure 400 of FIG. 4 and then returns to operation 214 of FIG. 2. This procedure may be used when data is being sent from a private domain to another private domain and described further below with reference to FIG. 5. If there is no DNS payload or after the procedure 400 of FIG. 4 is performed, the translated data is then sent to the second domain destination based on the routing information in operation 214. In the example of FIG. 3, data having source address 172.1.1.1 and destination address 192.1.1.1 is then sent to Server 112 of public Domain5.

When the Server 112 of public Domain5 responds to the Host 102a of private Domain1, the data will include source address 192.1.1.1. and destination address 172.1.1.1. When this data is handled by the procedure 200 of FIG. 2, it will now be determined in operation 205 that there is a binding for the destination address of the received data. This binding was previously formed when Host 102a initially sent data to server 112. That is, a binding associates the public destination address 172.1.1.1 and interface INT1 together with the private address 10.0.0.1. Thus, destination address 172.1.1.1 of the received data is translated into the private address 10.0.0.1 in operation 207. Since the source address is not a private address, the NAT device 104 sends the data with the translated destination address but the original public source address to Host 102a of Domain1 in operation 214. The sent data includes source address 192.1.1.1 and destination address 10.0.0.1.

The procedure 200 of FIG. 2 is performed for each set of received data. In one embodiment, the NAT device waits for data to be received on one of its interfaces. When data is received, the procedure of FIG. 2 is implemented on the received data. The illustrated NAT procedure of FIG. 2 is merely illustrated and is not meant to limit the scope of the invention. For example, the operation 204 for obtaining routing information may be performed anytime between receiving the data and sending the data out of the NAT device 104. By way of another example, the operations 205 and 207 for determining whether the destination address has a binding and translating the destination address, respectively, may be performed after translation of the source address.

Several typical operations that may be performed during a traditional NAT are omitted so as to not obscure the invention with unnecessary details which are well known to those skilled in the art. For instance, the present invention may include mechanisms for logging an error if a private address has no defined binding and there are no more available public address in the NAT device's pool. Additionally, mechanisms may be included for handling TCP packets. Several typical procedures that may be performed on data prior to translating the data and/or sending it to its destination are described further in U.S. patent having U.S. Pat. No. 5,793,763 by Mayes et al., issued Aug. 11, 1998, which patent is incorporated herein in its entirety.

Figure 5:
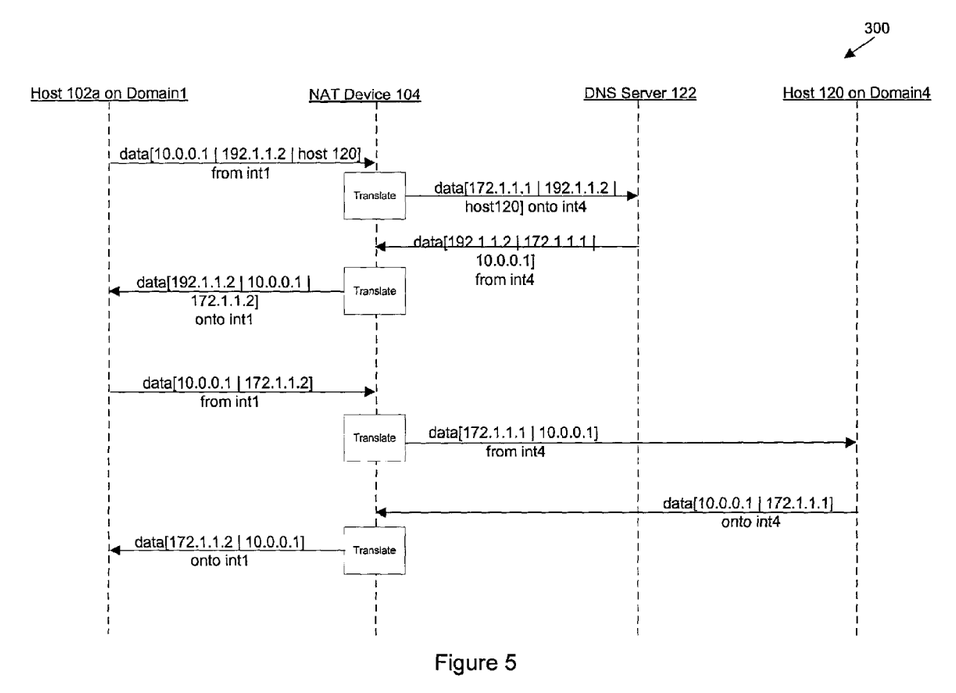
FIG. 5 illustrates one implementation of the translation techniques of the present invention for data sent from a first private domain to a second private domain.

The procedure 200 FIG. 2 may also be implemented when a host from a first private domain is sending data to a host from a second private domain. FIG. 5 illustrates one implementation of the translation techniques of the present invention for data sent from a first private domain to a second private domain. In this example, Host 102a of Domain1 wishes to send data to Host 120 of Domain4. However, since the address of Host 120 is private, Host 102a must initially obtain the address of Host 120 prior to sending data to Host 120. In one implementation, host 102 accomplishes this by sending a DNS request to the DNS Server 122 which knows the private address of Host 120. The DNS request includes source address 10.0.0.1 of Host 102a, destination address 192.1.1.2 of DNS server 122, and an identifier for Host 120. The identifier may be a public name, such as "yahoo.com", for Host 120. DNS server 122 will later match the name "yahoo.com" with the private address of Host 120.

When the NAT device 104 receives the DNS request from Host 102a, the private source address 10.0.0.1 is replaced with the address 172.1.1.1 which is selected from the NAT device's pool. (Also, any packet destined for this public pool address 172.1.1.1 is routed to the corresponding private destination address 10.0.0.1). The selected pool address 172.1.1.1 is bound to the private address 10.0.0.1 of Host 102a and its associated interface INT1. The NAT device 104 then sends the data with translated source address 172.1.1.1, destination address 192.1.1.2, and an identifier for Host 120 to DNS Server 122. The DNS Server 122 responds by sending a DNS reply having a source address 192.1.1.2, destination address 172.1.1.1.1, and DNS payload 10.0.0.1. The DNS payload is the IP address that corresponds to Host 120. That is, the DNS payload contains the private address of Host 120. It should be noted that this private address of Host 120 is the same as the private address of Host 102a.

When the NAT device receives the DNS reply from DNS Server 122, the public destination address 172.1.1.1 is translated into the private address 10.0.0.1 for Host 102a. This private address 10.0.0.1 was previously bound to the public address 172.1.1.1 and interface INT1. Since the source address 192.1.1.2 of DNS Sever 122 is not private, it is not translated. FIG. 4 is a flowchart illustrating a procedure 400 for handling a DNS payload in accordance with one embodiment of the present invention. Initially, it is determined whether the DNS payload address of the DNS reply is private in operation 402. If the payload address is not private, the DNS payload is not translated and the procedure returns to operation 214 of FIG. 2, where the DNS reply is sent to Host 102a based on the routing information (e.g., on interface INT1) in operation 524.

In the example of FIG. 5, the DNS payload address is private. When the DNS payload is private, the DNS payload is translated into a unique address selected from the pool in operation 404. That is, the DNS payload 10.0.0.1 is translated to the next available pool address 172.1.1.2. A binding is then created between the DNS payload address and its associated interface and the selected pool address in operation 406. In this case, a binding is created between public pool address 172.1.1.2 and private address 10.0.0.1 and INT4. The translated DNS reply is then sent to Host 102a based on the routing information in operation 214 of FIG. 2.

Host 102a can now send data to Host 120 since it now knows the public address for Host 120. This data includes source address 10.0.0.1 for Host 102a and destination address 172.1.1.2 for Host 120. When the NAT device receives this data, the source address 10.0.0.1 is translated into source address 172.1.1.1 which was previously bound to private address 10.0.0.1 and interface INT1. When Host 120 sends data to Host 102a, the data has source address 10.0.0.1 for Host 120 and destination address 172.1.1.1 for Host 102a. When the NAT device receives this data, the source address 10.0.0.1 is translated into source address 172.1.1.2 which was previously bound to private address 10.0.0.1 and interface INT4. Thus, since bindings are tracked for each interface, identical private addresses from different domains may be bound to different public addresses based on their respective interfaces.

Figure 6:
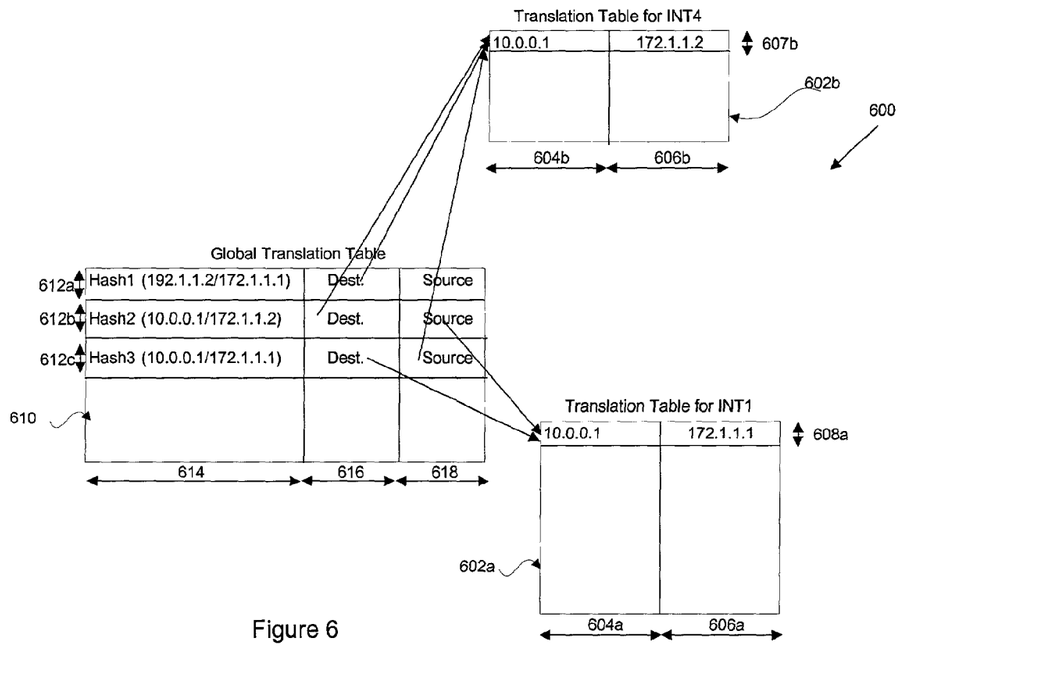
FIG. 6 is a diagrammatic representation of a set of Translation Tables for tracking bindings for each interface of a particular NAT device in accordance with one implementation of the present invention.

Any suitable mechanism may be implemented for tracking bindings for each interface of a NAT device. FIG. 6 is a diagrammatic representation of a set of Translation Tables 600 for tracking bindings for each interface of a particular NAT device in accordance with one implementation of the present invention. As shown, the Translation Tables 600 include a Global Translation Table 610. Each entry within the Global Translation Table 610 includes a hash value 614 of a pair of source and destination addresses for a particular data packet. Each hash value is associated with a destination pointer 616 and a source pointer 618. The destination and source pointers reference information that indicates how to translate the corresponding destination or source address, respectively, of a packet received into the NAT device. Either of these pointers of a particular Global Table entry may also reference null data (e.g., when the received data address does not require translation). As shown, the Global Translation Table 610 includes three entries 612a through 612c each having hash value 614, a destination pointer 616, and a source pointer 618. Each pointer references an entry within another Translation Table for a particular interface (e.g., INT1 or INT4). Each entry within each of the Translation Tables for Interfaces INT1 and INT4 includes a private address 604 and a corresponding public address 606.

When a particular data packet is received into the NAT device 104, a lookup in the Global Translation Table 610 is performed on the hash value of the packet's source and destination address to search for a binding for the received data packet's destination or source address. If a binding is found in the Global Translation Table 610, the found binding may be used to translate the source or destination of the received data packet. A found binding corresponds to an entry within the Global Translation Table 610. If the destination of the data packet requires translation (e.g., the destination address is private), the destination pointer 616 may be used to obtain a private address (or post-translation address) 606 for the received data packet's public address (or pre-translation destination) 604 from the appropriate Translation Table for the interface of the original data packet's destination address. Likewise if the source address of the data packet requires translation (e.g., the source address is private), the source pointer 618 may be used to obtain a public address 606 (post-translation address) for the received data packet's private source address 604 (pre-translation address) from the appropriate Translation Table for the interface associated with received packet's original source address.

Referring to the example of FIG. 5, when the Host 102*a* sends a DNS request having pre-translation source address 10.0.0.1 and destination address 192.1.1.2 to DNS Server 122, a first entry 612*a* having a hash value 614 for the post-translation source address 172.1.1.1 and destination 192.1.1.2 is formed within Global Table 610. This entry 612*a* has a destination pointer 616 that references a newly created translation entry 608*a* in the Translation Table for INT1. The translation entry 608*a* has private address 10.0.0.1 and its corresponding public address 172.1.1.1. This translation entry 608*a* may then be used to translate the destination address of the subsequent DNS reply that is sent by the DNS Server to Host 102*a*. After the DNS reply is sent, this first binding 612*a* is no longer needed and may be deleted from the Global Table 610.

A second binding 612*b* and a third binding 612*c* are created before, during, or after translating the DNS reply. The second binding has a hash value of the private address (10.0.0.1) of Host 102*a* and the public address of Host 120 (172.1.1.1.2), a destination pointer that references entry 607*b* of the Translation Table for INT4, and a source pointer that references entry 608*b* of the Translation Table for INT1. The third binding 612*c* has a hash value of the private address (10.0.0.1) of Host 120 and the public address of Host 102*a* (172.1.1.1.1), a destination pointer that references entry 608*b* of the Translation Table for INT1, and a source pointer that references entry 607*b* of the Translation Table for INT4.

Accordingly, when data is sent from Host 102*a* to Host 120, a binding is found for the hash value for the packet's destination address 10.0.0.1 and source address 172.1.1.2. The destination pointer and source pointer of entry 612*b* are then used to translate the destination from 10.0.0.1 to 172.1.1.1 and the source from 172.1.1.2 to 10.0.0.1, respectively. Likewise, when Host 120 sends data to Host 102*a*, a binding 612*c* is found for the hash of the packet's source address 10.0.0.1 and destination address 172.1.1.1. The destination pointer and source pointer of entry 612*c* are then used to translate the destination from 172.1.1.1 to 10.0.0.1 and the source from 10.0.0.1 to 172.1.1.2, respectively.

Mechanisms may also be provided for tracking which interfaces may talk to which other interfaces. For example, a domain, such as cnn.com, may wish to only access other computer on the Internet and not other private networks. In contrast, a particular private domain may wish to communicate with one or more other private domains. In other words, groupings may be set up to allow specific domains to communicate with other specific domains. These groupings (herein referred to as NAT Virtual Interfaces (NVI's) may be implemented in any suitable manner.

Figure 7:
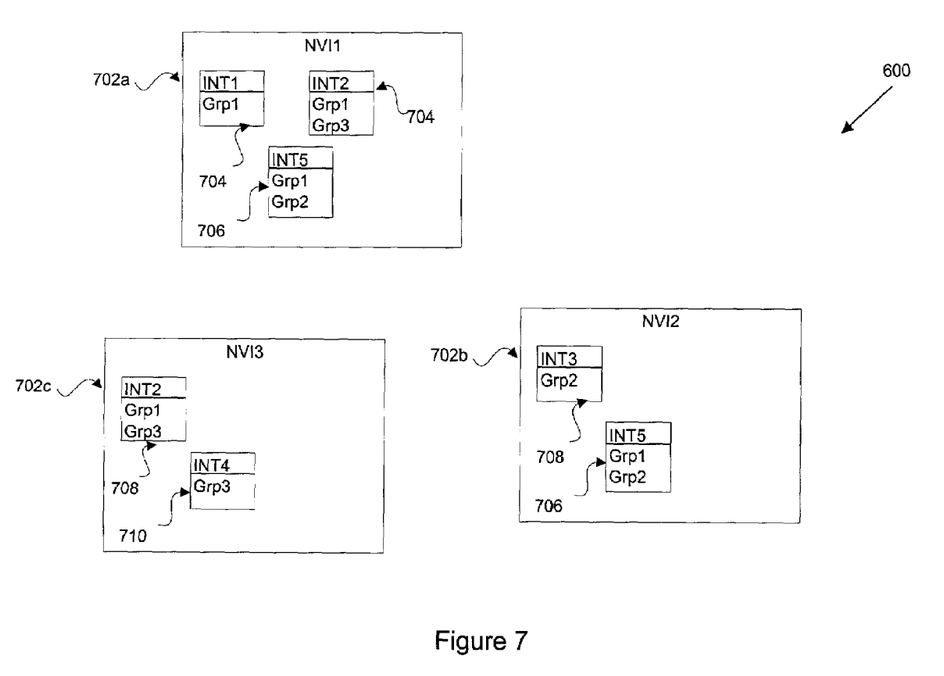
FIG. 7 is a representation of a plurality of different NAT virtual interfaces (NVI's) in accordance with one embodiment of the present invention.

FIG. 7 is a representation of a plurality of different NAT virtual interfaces (NVI's) 702 in accordance with one embodiment of the present invention. As shown, a first NVI1 702*a*, a second NVI2 702*b*, and a third NVI3 are present. Any number and type of NVI's may be formed or dismantled during any time. Each NVI 702 generally defines which interfaces may be coupled together and may communicate with each other. Each NVI may also be assigned a different pool of public address to be used during NAT. As shown, NVI1 702*a* includes interfaces INT1, INT2, and INT5 (from FIG. 1). Each interface may be configured with one or more groups. Each group of an interface defines which NVI group(s) to which the interface belongs. In other words, an NVI is defined with a group number, e.g., NVI1, and any interface belonging to that NVI are configured with the same group number, e.g., NAT enabled group 1. As shown, interfaces INT1, INT2, and INT5 are each configured to belong to group 1. Accordingly, INT1, INT2, and INT5 belong to NVI1. Likewise, interfaces INT3 and INT5 are configured to belong to group 2. Thus, INT3 and INT5 belong to NVI2. Similarly, interfaces INT2 and INT4 are configured to belong to group 3 and, accordingly, belong to NVI3.

Generally, the techniques for performing network address translation may be implemented on software and/or hardware. For example, they can be implemented in an operating system kernel, in a separate user process, in a library package bound into network applications, on a specially constructed machine, or on a network interface card. In a specific embodiment of this invention, the techniques of the present invention are implemented in software such as an operating system or in an application running on an operating system.

A software or software/hardware hybrid packet processing system of this invention is preferably implemented on a general-purpose programmable machine selectively activated or reconfigured by a computer program stored in memory. Such programmable machine may be a network device designed to handle network traffic. Such network devices typically have multiple network interfaces including frame relay and ISDN interfaces, for example. Specific examples of such network devices include routers and switches. For example, the packet processing systems of this invention may be specially configured routers such as specially configured router models 1600, 2500, 2600, 3600, 4500, 4700, 7200, 7500, and 12000 available from Cisco Systems, Inc. of San Jose, Calif. A general architecture for some of these machines will appear from the description given below. In an alternative embodiment, the packet processing system (e.g., NAT device) may be implemented on a general-purpose network host machine such as a personal computer or workstation. Further, the invention may be at least partially implemented on a card (e.g., an interface card) for a network device or a general-purpose computing device.

Figure 8:
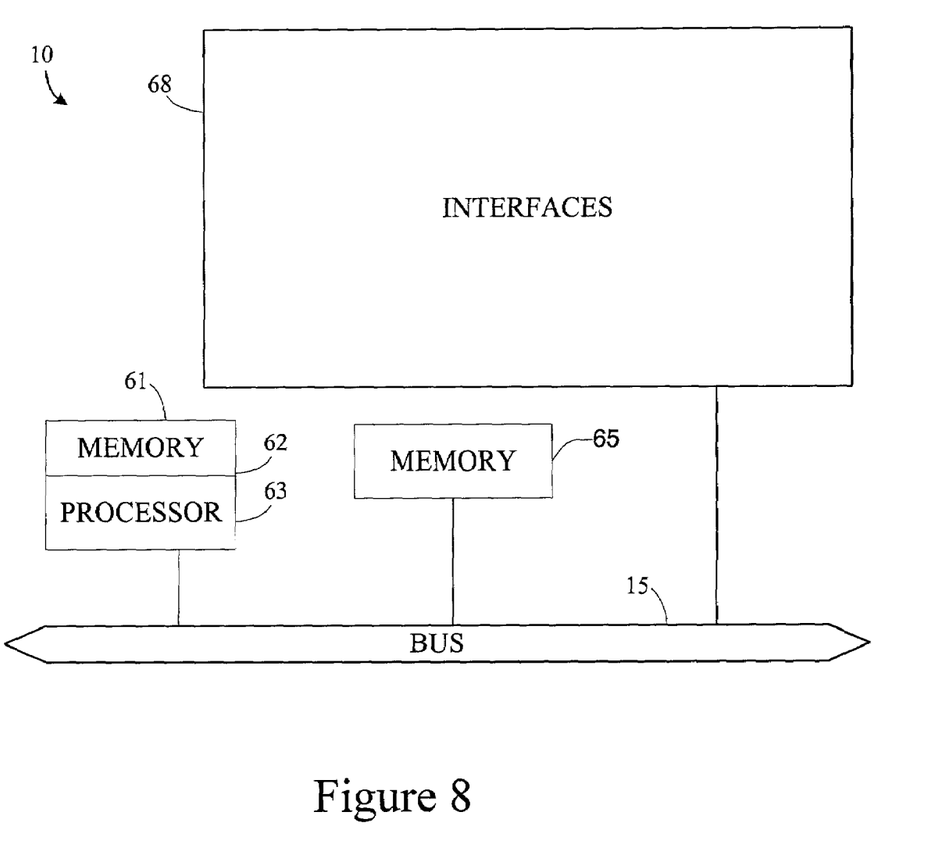
FIG. 8 is a diagrammatic representation of a router in which embodiments of the present invention may be implemented.

Referring now to FIG. 8, a router 10 suitable for implementing embodiments of the present invention includes a master central processing unit (CPU) 62, interfaces 68, and a bus 15 (e.g., a PCI bus). When acting under the control of appropriate software or firmware, the CPU 62 is responsible for such router tasks as routing table computations and network management. It may also be responsible for determining whether an address is a private address, determining whether a binding is present for a private address, and translating a private address or a DNS payload address into a public pool address, etc. It preferably accomplishes all these functions under the control of software including an operating system (e.g., the Internetwork Operating System (IOS®) of Cisco Systems, Inc.) and any appropriate applications software. CPU 62 may include one or more processors 63 such as a processor from the Motorola family of microprocessors or the MIPS family of microprocessors. In an alternative embodiment, processor 63 is specially designed hardware for controlling the operations of router 10. In a specific embodiment, a memory 61 (such as non-volatile RAM and/or ROM) also forms part of CPU 62. However, there are many different ways in which memory could be coupled to the system. Memory block 61 may be used for a variety of purposes such as, for example, caching and/or storing data, programming instructions, etc.

The interfaces 68 are typically provided as interface cards (sometimes referred to as "line cards"). Generally, they control the sending and receiving of data packets or data segments over the network and sometimes support other peripherals used with the router 10. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 62 to efficiently perform routing computations, network diagnostics, security functions, etc.

Although the system shown in FIG. 8 is one specific router of the present invention, it is by no means the only router architecture on which the present invention can be implemented. For example, an architecture having a single processor that handles communications as well as routing computations, etc. is often used. Further, other types of interfaces and media could also be used with the router.

Regardless of network device's configuration, it may employ one or more memories or memory modules (such as, for example, memory block 65) configured to store data, program instructions for the general-purpose network operations and/or the inventive techniques described herein. The program instructions may control the operation of an operating system and/or one or more applications, for example. The memory or memories may also be configured to store received packets, identifiers to track each flow and the number of such flows, one or more Translation Tables, NVI constructs, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks and DVDs; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

What is claimed is:

1. A method for performing network address translation on data, the method comprising:

receiving a first data having a first source address and a first destination address, wherein the first data is sent by a first node in a first domain to a second node in a second domain, and wherein the first data is received into a first interface associated with the first domain and output from a second interface associated with the second domain, and wherein the first domain differs from the second domain, and wherein the first and second interfaces are virtual interfaces that are each configurably associated with one or more domains;

obtaining routing information for the first data;

if the first source address is a private address and if a binding between the first source address, the first interface, and a first public address is found, translating the first source address into the first public address specified by the found binding prior to sending the first data to the second domain destination;

if the first source address is a private address and if a binding between the first source address, the first interface, and a first public address is not found, translating the first source address into a selected public address and forming and storing a first binding between the first source address, the selected public address, and the first interface, wherein the translation is performed prior to sending the first data to the second domain destination;

if a destination binding between the first destination address, a first private address, and the second interface is found, translating the first destination address into the first private address specified by the destination binding, wherein the translation of the first destination address is performed prior to sending the first data out the second interface to the second node; and sending the first data to the second node based on the routing information.

2. A method as recited in claim 1, further comprising:

receiving a second data having a second source address and a second destination address, wherein the second data is sent by a third node in a third domain to a fourth node in a fourth domain, and wherein the first data is received into a third interface associated with the third domain and output from a fourth interface associated with the fourth domain, and wherein the third domain differs from the first domain but the second source address is the same as the first source address;

obtaining routing information for the second data;

if the second source address is a private address and if a binding between the second source address, the third interface, and a second public address is found, translating the second source address into the second public address specified by the found binding prior to sending the second data from the fourth domain interface;

if the second source address is a private address and if a binding between the second source address, the third interface, and a second public address is not found, translating the second source address into a selected public address and forming and storing a second binding between the second source address, the selected public address, and the third interface, wherein the translation is performed prior to sending the second data from the fourth interface;

if a second destination binding between the second destination address, a second private address, and the fourth interface is found, translating the second destination address into the second private address specified by the second destination binding, wherein the translation of the second destination address is performed prior to sending the second data out the fourth interface to the fourth node; and sending the second data to the fourth node based on the routing information.

3. A method as recited in claim 1, wherein the first public address is selected from a pool of available public addresses.

4. A method as recited in claim 1, wherein when the first data has a DNS payload, the method further comprises:
   translating the DNS payload of the first data into a second public address, wherein the translation of the first destination address is performed prior to sending the first data to the second node; and
   forming a second binding between the DNS payload address, the second public address, and the first interface.

5. A method as recited in claim 1, wherein the first data is a DNS request, the method further comprising:
   receiving a second data after the first data, wherein the second data has a second source address, a second destination address, and a DNS payload address, wherein the second data is sent by a third node in the second domain to the first node in the first domain, and wherein the second data is a DNS reply received into the second interface and output from the first interface;
   obtaining routing information for the second data;
   translating the DNS payload address into a second public address and forming a second binding between the DNS payload address, the second public address, and the second interface, wherein the translation is performed prior to sending the second data out the first interface to the first node; and
   sending the second data to the first node based on the routing information obtained for the second data.

6. A method as recited in claim 5, wherein the first binding between the first source address, the first public address, and the first interface is formed by creating a first entry in a first table that includes a first identifier for both the first public address and the first destination address, a destination pointer that references information on how to translate a destination address of a first subsequently received data from the first public address to the first source address, and a source pointer that references a null value.

7. A method as recited in claim 6, wherein the source pointer referencing a null value indicates that the source address of the first subsequently received data does not require translation.

8. A method as recited in claim 7, the method further comprising modifying the first binding, wherein the first binding is modified and the second binding is formed by:
   creating a second entry in the first table that includes a second identifier for both the first source address and the second public address, a destination pointer that references information on how to translate a destination address of a second subsequently received data from the second public address into the DNS payload address, and a source pointer that references information on how to translate a source address of the same second subsequently received data from the first source address into the first public address; and
   creating a third entry in the first table that includes a third identifier for both the DNS payload address and the first public address, a destination pointer that references information on how to translate a destination address of a third subsequently received data from the first public address into the first source address, and a source pointer that references information on how to translate a source address of the third subsequently received data from the DNS payload address into the second public address.

9. A method as recited in claim 8, wherein the destination and source pointers each reference a pair having a private address of a particular interface and a corresponding public address, wherein the pair provide pre-translation and post-translation addresses for a particular source or destination address.

10. A method as recited in claim 1, wherein each virtual interface defines which interfaces may communicate with which other interfaces.

11. A method as recited in claim 10, wherein each virtual interface defines which interfaces may communicate with which other interfaces by specifying each interface as belonging to one or more groups so that a particular interface is specified as being allowed to communicate with another interface if the particular interface and other interface belong to a same group.

12. A method as recited in claim 11, the method further comprising selecting a pool of public addresses for each group.

13. A network address translation (NAT) system operable to perform network address translation on data, the NAT system comprising:
   one or more processors;
   one or more memory, wherein at least one of the processors and memory are adapted to:
   receive a first data having a first source address and a first destination address, wherein the first data is sent by a first node in a first domain to a second node in a second domain, and wherein the first data is received into a first interface associated with the first domain and output from a second interface associated with the second domain, and wherein the first domain differs from the second domain, and wherein the first and second interfaces are virtual interfaces that are each configurably associated with one or more domains;
   obtain routing information for the first data;
   if the first source address is a private address and if a binding between the first source address, the first interface, and a first public address is found, translate the first source address into the first public address specified by the found binding prior to sending the first data to the second domain destination;
   if the first source address is a private address and if a binding between the first source address, the first interface, and a first public address is not found, translate the first source address into a selected public address and form and store a first binding between the first source address, the selected public address, and the first interface, wherein the translation is performed prior to sending the first data to the second domain destination;
   if a destination binding between the first destination address, a first private address, and the second interface is found, translate the first destination address into the first private address specified by the destination binding, wherein the translation of the first destination address is performed prior to sending the first data out the second interface to the second node; and
   send the first data to the second node based on the routing information.

14. A NAT system as recited in claim 13, wherein when the first data has a DNS payload, one or more memory, wherein at least one of the processors and memory are further adapted to:

translate the DNS payload of the first data into a second public address, wherein the translation of the first destination address is performed prior to sending the first data to the second node; and form a second binding between the DNS payload address, the second public address, and the first interface.

15. A NAT system as recited in claim 13, wherein the first data is a DNS request, wherein at least one of the processors and memory are further adapted to:

receive a second data after the first data, wherein the second data has a second source address, a second destination address, and a DNS payload address, wherein the second data is sent by a third node in the second domain to the first node in the first domain, and wherein the second data is a DNS reply received into a the second interface and output from the first interface;

obtain routing information for the second data;

translate the DNS payload address into a second public address and forming a second binding between the DNS payload address, the second public address, and the second interface, wherein the translation is performed prior to sending the second data out the first interface to the first node; and send the second data to the first node based on the routing information obtained for the second data.

16. A NAT system as recited in claim 15, wherein the first binding between the first source address, the first public address, and the first interface is formed by creating a first entry in a first table that includes a first identifier for both the first public address and the first destination address, a destination pointer that references information on how to translate a destination address of a first subsequently received data from the first public address to the first source address, and a source pointer that references a null value.

17. A NAT system as recited in claim 16, wherein the source pointer referencing a null value indicates that the source address of the first subsequently received data does not require translation.

18. A NAT system as recited in claim 17, wherein at least one of the processors and memory are further adapted to modify the first binding, wherein the first binding is modified and the second binding is formed by:

creating a second entry in the first table that includes a second identifier for both the first source address and the second public address, a destination pointer that references information on how to translate a destination address of a second subsequently received data from the second public address into the DNS payload address, and a source pointer that references information on how to translate a source address of the same second subsequently received data from the first source address into the first public address; and creating a third entry in the first table that includes a third identifier for both the DNS payload address and the first public address, a destination pointer that references information on how to translate a destination address of a third subsequently received data from the first public address into the first source address, and a source pointer that references information on how to translate a source address of the third subsequently received data from the DNS payload address into the second public address.

19. A NAT system as recited in claim 18, wherein the destination and source pointers each reference a pair having a private address of a particular interface and a corresponding public address, wherein the pair provide pre-translation and post-translation addresses for a particular source or destination address.

20. A NAT system as recited in claim 13, wherein each virtual interface defines which interfaces may communicate with which other interfaces.

21. A NAT system as recited in claim 20, wherein each virtual interface defines which interfaces may communicate with which other interfaces by specifying each interface as belonging to one or more groups so that a particular interface is specified as being allowed to communicate with another interface if the particular interface and other interface belong to a same group.

22. A NAT system as recited in claim 21, wherein at least one of the processors and memory are further adapted to select a pool of public addresses for each group.

23. A NAT system as recited in claim 13, wherein at least one of the processors and memory are further adapted to:

receive a second data having a second source address and a second destination address, wherein the second data is sent by a third node in a third domain to a fourth node in a fourth domain, and wherein the first data is received into a third interface associated with the third domain and output from a fourth interface associated with the fourth domain, and wherein the third domain differs from the first domain but the second source address is the same as the first source address;

obtain routing information for the second data;

if the second source address is a private address and if a binding between the second source address, the third interface, and a second public address is found, translate the second source address into the second public address specified by the found binding prior to sending the second data from the fourth domain interface;

if the second source address is a private address and if a binding between the second source address, the third interface, and a second public address is not found, translate the second source address into a selected public address and form and store a second binding between the second source address, the selected public address, and the third interface, wherein the translation is performed prior to sending the second data from the fourth interface;

if a second destination binding between the second destination address, a second private address, and the fourth interface is found, translate the second destination address into the second private address specified by the second destination binding, wherein the translation of the second destination address is performed prior to sending the second data out the fourth interface to the fourth node; and send the second data to the fourth node based on the routing information.

24. A computer program product for performing network address translation on data, the computer program product comprising: at least one machine-readable medium; computer program instructions stored within the at least one machine-readable medium configured to cause a network address translation system to:

receive a first data having a first source address and first destination address, wherein the first data is sent by a first node in a first domain to a second node in a second domain, and wherein the first data is received into a first interface associated with the first domain and output from a second interface associated with the second domain, and wherein the first domain differs from the second domain, and wherein the first and second interfaces are virtual interfaces that are each configurably associated with one or more domains;
obtain routing information for the first data;
if the first source address is a private address and if a binding between the first source address, the first interface, and a first public address is found, translate the first source address into the first public address specified by the found binding prior to sending the first data to the second domain destination;
if the first source address is a private address and if a binding between the first source address, the first interface, and a first public address is not found, translate the first source address into a selected public address and form and store a first binding between the first source address, the selected public address, and the first interface, wherein the translation is performed prior to sending the first data to the second domain destination;
if a destination binding between the first destination address, a first private address, and the second interface is found, translate the first destination address into the first private address specified by the destination binding, wherein the translation of the first destination address is performed prior to sending the first data out the second interface to the second node; and
send the first data to the second node based on the routing information.

25. A computer program product as recited in claim 24, wherein when the first data has a DNS payload, one or more memory, wherein the computer program instructions are further configured to cause the network address translation system to
translate the DNS payload of the first data into a second public address, wherein the translation of the first destination address is performed prior to sending the first data to the second node; and
form a second binding between the DNS payload address, the second public address, and the first interface.

26. A computer program product as recited in claim 24, wherein the first data is a DNS request, wherein the computer program instructions are further configured to cause the network address translation system to
receive a second data after the first data, wherein the second data has a second source address, a second destination address, and a DNS payload address, wherein the second data is sent by a third node in the second domain to the first node in the first domain, and wherein the second data is a DNS reply received into a the second interface and output from the first interface;
obtain routing information for the second data;
translate the DNS payload address into a second public address and forming a second binding between the DNS payload address, the second public address, and the second interface, wherein the translation is performed prior to sending the second data out the first interface to the first node; and
send the second data to the first node based on the routing information obtained for the second data.

27. A computer program product as recited in claim 26, wherein the first binding between the first source address, the first public address, and the first interface is formed by creating a first entry in a first table that includes a first identifier for both the first public address and the first destination address, a destination pointer that references information on how to translate a destination address of a first subsequently received data from the first public address to the first source address, and a source pointer that references a null value.

28. A computer program product as recited in claim 27, wherein the source pointer referencing a null value indicates that the source address of the first subsequently received data does not require translation.

29. A computer program product as recited in claim 28, wherein the computer program instructions are further configured to cause the network address translation system to modify the first binding, wherein the first binding is modified and the second binding is formed by:
creating a second entry in the first table that includes a second identifier for both the first source address and the second public address, a destination pointer that references information on how to translate a destination address of a second subsequently received data from the second public address into the DNS payload address, and a source pointer that references information on how to translate a source address of the same second subsequently received data from the first source address into the first public address; and
creating a third entry in the first table that includes a third identifier for both the DNS payload address and the first public address, a destination pointer that references information on how to translate a destination address of a third subsequently received data from the first public address into the first source address, and a source pointer that references information on how to translate a source address of the third subsequently received data from the DNS payload address into the second public address.

30. A computer program product as recited in claim 29, wherein the destination and source pointers each reference a pair having a private address of a particular interface and a corresponding public address, wherein the pair provide pre-translation and post-translation addresses for a particular source or destination address.

31. A computer program product as recited in claim 24, wherein each virtual interface defines which interfaces may communicate with which other interfaces.

32. A computer program product as recited in claim 31, wherein each virtual interface defines which interfaces may communicate with which other interfaces by specifying each interface as belonging to one or more groups so that a particular interface is specified as being allowed to communicate with another interface if the particular interface and other interface belong to a same group.

33. A computer program product as recited in claim 32, wherein the computer program instructions are further configured to cause the network address translation system to select a pool of public addresses for each group.

34. A computer program product as recited in claim 24, the computer program instructions stored within the at least one computer readable product further configured to cause the network address translation system to:
receive a second data having a second source address and a second destination address, wherein the second data is sent by a third node in a third domain to a fourth node in a fourth domain, and wherein the first data is received into a third interface associated with the third domain and output from a fourth interface associated with the fourth domain, and wherein the third domain differs from the first domain but the second source address is the same as the first source address;
obtain routing information for the second data;
if the second source address is a private address and if a binding between the second source address, the third interface, and a second public address is found, translate the second source address into the second public address specified by the found binding prior to sending the second data from the fourth domain interface;

if the second source address is a private address and if a binding between the second source address, the third interface, and a second public address is not found, translate the second source address into a selected public address and form and store a second binding between the second source address, the selected public address, and the third interface, wherein the translation is performed prior to sending the second data from the fourth interface;

if a second destination binding between the second destination address, a second private address, and the fourth interface is found, translate the second destination address into the second private address specified by the second destination binding, wherein the translation of the second destination address is performed prior to sending the second data out the fourth interface to the fourth node; and send the second data to the fourth node based on the routing information.

35. An apparatus for performing network address translation on data, the apparatus comprising:

means for receiving a first data having a first source address and a first destination address, wherein the first data is sent by a first node in a first domain to a second node in a second domain, and wherein the first data is received into a first interface associated with the first domain and output from a second interface associated with the second domain, and wherein the first domain differs from the second domain, and wherein the first and second interfaces are virtual interfaces that are each configurably associated with one or more domains;

means for obtaining routing information for the first data;

means for, if the first source address is a private address and if a binding between the first source address, the first interface, and a first public address is found, translating the first source address into the first public address specified by the found binding prior to sending the first data to the second domain destination;

means for translating the first source address into a selected public address and forming a first binding between the first source address, the selected public address, and the first interface if the first source address is a private address and if a binding between the first source address, the first interface, and a first public address is not found, wherein the translation is performed prior to sending the first data to the second domain destination;

means for translating the first destination address into the first private address specified by the destination binding if a destination binding between the first destination address, a first private address, and the second interface is found, wherein the translation of the first destination address is performed prior to sending the first data out the second interface to the second node; and means for sending the first data to the second node based on the routing information.

36. An apparatus as recited in claim 35, wherein the first data is a DNS request, the apparatus further comprising:

means for receiving a second data after the first data, wherein the second data has a second source address, a second destination address, and a DNS payload address, wherein the second data is sent by a third node in the second domain to the first node in the first domain, and wherein the second data is a DNS reply received into the second interface and output from the first interface;

means for obtaining routing information for the second data;

means for translating the DNS payload address into a second public address and forming a second binding between the DNS payload address, the second public address, and the second interface, wherein the translation is performed prior to sending the second data out the first interface to the first node; and means for sending the second data to the first node based on the routing information obtained for the second data.

* * * * *